(12) United States Patent
Braganza et al.

(10) Patent No.: US 8,978,761 B2
(45) Date of Patent: Mar. 17, 2015

(54) HYDRATED SHEET SILICATE MINERALS FOR REDUCING PERMEABILITY IN A WELL

(75) Inventors: Giselle K. Braganza, Pune (IN); Prerana U. Suryawanshi, Prune (IN); Achala V. Danait, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 323 days.

(21) Appl. No.: 13/430,895

(22) Filed: Mar. 27, 2012

(65) Prior Publication Data

US 2013/0255944 A1 Oct. 3, 2013

(51) Int. Cl.
*E21B 33/138* (2006.01)
*C09K 8/58* (2006.01)
*C09K 8/504* (2006.01)

(52) U.S. Cl.
CPC ............. *E21B 33/138* (2013.01); *C09K 8/5045* (2013.01)
USPC ............................. 166/300; 166/279; 166/293

(58) Field of Classification Search
CPC ...... E21B 33/138; E21B 43/30; C09K 8/5045
See application file for complete search history.

(56) References Cited

U.S. PATENT DOCUMENTS

| | | | |
|---|---|---|---|
| 4,600,057 | A | 7/1986 | Borchardt |
| 4,640,361 | A | 2/1987 | Smith et al. |
| 4,651,824 | A * | 3/1987 | Gradle ........................... 166/245 |
| 5,168,928 | A | 12/1992 | Terry et al. |
| 5,320,171 | A | 6/1994 | Laramay |
| 5,335,726 | A | 8/1994 | Rodrigues |
| 5,358,051 | A | 10/1994 | Rodrigues |
| 5,836,392 | A | 11/1998 | Urlwin-Smith |
| 6,187,839 | B1 | 2/2001 | Eoff et al. |
| 6,192,986 | B1 | 2/2001 | Urlwin-Smith |
| 6,889,766 | B2 | 5/2005 | Creel et al. |
| 6,936,574 | B2 | 8/2005 | Dao et al. |
| 7,098,171 | B2 | 8/2006 | Thaemlitz |
| 7,128,148 | B2 | 10/2006 | Eoff et al. |
| 7,204,310 | B1 | 4/2007 | Roddy et al. |
| 7,285,166 | B2 | 10/2007 | Luke et al. |
| 7,287,586 | B2 | 10/2007 | Everett et al. |
| 7,338,923 | B2 | 3/2008 | Roddy et al. |
| 7,563,750 | B2 | 7/2009 | Eoff et al. |

(Continued)

FOREIGN PATENT DOCUMENTS

| | | |
|---|---|---|
| EP | 0566118 B2 | 10/2001 |
| GB | 2399364 A | 9/2004 |

OTHER PUBLICATIONS

Dennis Eberl, et al., Hydrothermal Reactivity of Smectite; American Mineralogist, vol. 63, pp. 401-409. 1978.

(Continued)

*Primary Examiner* — Zakiya W Bates
(74) *Attorney, Agent, or Firm* — Holly Soehnge; Baker Botts L.L.P.

(57) ABSTRACT

A method of treating a treatment zone in a well is provided. The method includes the step of introducing into the treatment zone: (a) a hydrated sheet silicate mineral; and (b) a chemical activator for expanding the hydrated sheet silicate mineral. According to an embodiment, a method of treating a treatment zone in a well, where the method includes the steps of, in any order: (a) introducing into the treatment zone a first treatment fluid, wherein the first treatment fluid includes: (i) a hydrated sheet silicate mineral; and (ii) water; and (b) introducing into the zone a second treatment fluid including a chemical activator for expanding the hydrated sheet silicate mineral in the treatment zone.

22 Claims, 1 Drawing Sheet

(56) References Cited

U.S. PATENT DOCUMENTS

| | | |
|---|---|---|
| 7,759,292 B2 | 7/2010 | Eoff et al. |
| 7,866,394 B2 | 1/2011 | Creel et al. |
| 2010/0250623 A1 | 9/2010 | Manis et al. |
| 2011/0006263 A1 | 1/2011 | Caplain et al. |

OTHER PUBLICATIONS

Kathryn E. Parker; Bleaching With Green Oxidation Chemistry, American Chemical Society.

Spectrum Laboratory Products, Inc., Material Safety Data Sheet—NFPA Rating. Sep. 21, 2009.

Halliburton; Technology Bulletin SMA-03-003-E; Oct. 5, 2009.

Smalley, "Effect of Hydrostatic Pressure on the Swelling of n-Butylammonium Vermiculite" Clays and Clay Minerals, vol. 37, No. 5, 474-478, 1989.

Williams-Daryn "THe Intercalation of a Vermiculite by Cationic Surfactants and Its Subsequent Swelling with Organic Solvents" Journal of Colloid and Interface Science 255, 303-311, 2002.

* cited by examiner

HYDRATED SHEET SILICATE MINERALS FOR REDUCING PERMEABILITY IN A WELL

TECHNICAL FIELD

The inventions are in the field of producing crude oil or natural gas from subterranean formations. More specifically, the inventions generally relate to reducing the permeability of subterranean formation in a well. This can be useful, for example, for reducing excessive water production during the production of oil or gas or blocking water production from a zone.

BACKGROUND ART

Oil & Gas Wells

In the context of production from a well, oil and gas are understood to refer to crude oil and natural gas. Oil and gas are naturally occurring hydrocarbons in certain subterranean formations.

A subterranean formation is a body of rock that has sufficiently distinctive characteristics and is sufficiently continuous for geologists to describe, map, and name it. In the context of formation evaluation, a subterranean formation refers to the volume of rock seen by a measurement made through a wellbore, as in a log or a well test. These measurements indicate the physical properties of this volume of rock, such as the property of permeability.

A subterranean formation having a sufficient porosity and permeability to store and transmit fluids is sometimes referred to as a reservoir.

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

There are conventional and non-conventional types of reservoirs.

In a conventional reservoir, the hydrocarbons flow to the wellbore in a manner which can be characterized by flow through permeable media, where the permeability may or may not have been altered near the wellbore, or flow through permeable media to a permeable or (conductive), bi-wing fracture placed in the formation. A conventional reservoir typically has a matrix permeability greater than about 1 milliDarcy (equivalent to about 1,000 microDarcy).

A conventional reservoir is usually in a shape that will trap hydrocarbons and that is covered by a relatively impermeable rock, known as cap rock. The cap rock forms a barrier above reservoir rock so that fluids cannot migrate beyond the reservoir. A cap rock capable of being a barrier to fluid migration on a geological time scale has a permeability that is less than about 1 microDarcy. Cap rock is commonly salt, anhydrite, or shale.

In addition, the hydrocarbons located in the reservoir are located vertically based on their density where the movement of one of the reservoir fluid can apply a driving force to another reservoir fluid. Most conventional reservoir rocks are limestones, dolomites, sandstones, or a combination of these.

To produce oil or gas, a well is drilled into a subterranean formation that is an oil or gas reservoir. A well includes a wellhead and at least one wellbore from the wellhead penetrating the earth.

The wellhead is the surface termination of a wellbore, which surface may be on land or on a seabed. A well site or job site is the geographical location of a well head. It may include related facilities, such as a tank battery, separators, compressor stations, heating or other equipment, and fluid pits. If offshore, a well site can include a platform.

Typically, a wellbore must be drilled hundreds or thousands of feet into the earth to reach an oil or gas bearing formation. Generally, the greater the depth of the formation, the higher the static temperature and pressure of the formation.

The "wellbore" refers to the drilled hole, including any cased or uncased portions of the well. The "borehole" usually refers to the inside wellbore wall, that is, the rock face or wall that bounds the drilled hole. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

Broadly, a zone refers to an interval of rock along a wellbore that is differentiated from uphole and downhole zones based on hydrocarbon content or other features, such as permeability, composition, perforations or other fluid communication with the wellbore, faults, or fractures. A zone of a wellbore that penetrates a hydrocarbon-bearing zone that is capable of producing hydrocarbon is referred to as a "production zone." As used herein, a "treatment zone" refers to an interval of rock along a wellbore into which a well fluid is directed to flow from the wellbore.

Well Servicing and Well Fluids

Generally, well services include a wide variety of operations that may be performed in oil, gas, geothermal, or water wells, such as drilling, cementing, completion, and intervention. These well services are designed to facilitate or enhance the production of desirable fluids such as oil or gas from or through a subterranean formation.

A well service usually involves introducing a well fluid into a well. As used herein, a "well fluid" is a fluid used in a well service. As used herein, a "well fluid" broadly refers to any fluid adapted to be introduced into a well for any purpose. A well fluid can be, for example, a drilling fluid, a cementing composition, a treatment fluid, or a spacer fluid.

Common Well Treatments and Treatment Fluids

Well services can include various types of treatments that are commonly performed in a wellbore or subterranean formation.

For example, a treatment for fluid-loss control can be used during any of drilling, completion, and intervention operations. During completion or intervention, stimulation is a type of treatment performed to enhance or restore the productivity of oil and gas from a well. Stimulation treatments fall into two main groups: hydraulic fracturing and matrix treatments. Fracturing treatments are performed above the fracture pressure of the subterranean formation to create or extend a highly permeable flow path between the formation and the wellbore. Matrix treatments are performed below the fracture pressure of the formation. Other types of completion or intervention treatments can include, for example, gravel packing, consolidation, and controlling excessive water production, and controlling sand or fines production. Still other types of completion or intervention treatments include, but are not limited to, damage removal, formation isolation, wellbore cleanout, scale removal, and scale control. Of course, other well treatments and treatment fluids are known in the art.

Improving Oil/Water Ratio in Production ("Conformance Control")

Water production from oil and gas wells is a widespread problem that causes significant economic drawbacks. High water rates cause a reduction in well productivity, increase operating expenditures, and can completely block production from wells. Controlling and eliminating unwanted water influx into oil or gas wells is a major concern of producers.

The water can be the result of a water-producing zone communicating with the oil or gas producing zone by fractures, high-permeability streaks, fissures, vugs, or the like, or it can be caused by a variety of other occurrences which are well known to those skilled in the art such as water coning, water cresting, bottom water, channeling at the well bore, etc. The water may approach from one or more directions (from below, from the sides, or from above). Usually water is produced at the cost of oil or gas recovery, and, in severe cases, the water influx becomes so great that the oil or gas production is choked off completely.

In enhanced recovery techniques such as water flooding, an aqueous flood or displacement fluid is injected under pressure into an oil containing subterranean formation by way of one or more injection wells. The flow of the aqueous fluid through the formation displaces oil or gas and drives it to one or more producing wells. However, the aqueous displacement fluid tends to flow through the most permeable zones in the subterranean formation, whereby less permeable zones containing oil or gas are bypassed. This uneven flow of the aqueous displacement fluid through the formation reduces the overall yield of hydrocarbons from the formation.

Heretofore, enhanced recovery problems in a subterranean oil containing formation caused by permeability variations therein have been corrected by reducing the permeability of the subterranean formation flow paths. The techniques utilized to accomplish this reduction in the permeability of high permeability zones are sometimes referred to in the art as "conformance control techniques." Decreasing excess water production increases the production water/oil ratio ("WOR"), lowering water-handling cost. Conformance control techniques can extend a well's economic life, increasing return on investment. Oil production increases as water production decreases.

A number of methods for controlling water production from subterranean formations have been proposed. For example, methods include processes designed to block pores or channels within a formation by gelation using polymer materials such as polyvinyl alcohol and polyacrylic acid. See, for example, U.S. Pat. Nos. 7,759,292 and 7,563,750, which are incorporated herein by reference. See also, for example, Great Britain Patent No. GB-A-2399364.

Another method that has been proposed involves introducing a barrier, such as a concrete resin, adjacent to the well bore in order to prevent the movement of water into the bore.

More recently, methods to achieve selective water control without the need for zonal isolation techniques comprising hydrophilic polymers have been proposed. It is thought that the hydrophilicity of the polymer affords the desired selectivity. It leads to preferential partition into those channels and pores of the formation having high levels of water without impairment to oil and gas production.

A drawback with the polymers used for water shut-off treatment is that they are partially unstable at high temperatures (i.e., greater than 110° C.). Also, some polymers have a tendency of precipitation at higher temperature in the presence of acid and saturated heavy brines See US Patent Publication No. 2010/0256023, which is incorporated herein by reference. Exposure to such temperatures and/or chemicals can cause the polymers to decompose and/or degrade thereby nullifying their blocking effect. When this occurs, the formation then has to be re-treated which increases the cost further.

Polyacrylamide is commonly used as one of the polymers in water shut-off. Unfortunately, it is potentially damaging the environment because the acrylamide monomer produced on decomposition of polyacrylamide is known to be a nerve toxin.

There is a continuing need for improved methods for controlling or blocking water production from certain subterranean zones. It would also be desirable for the methods to avoid risking damage the environment.

SUMMARY OF THE INVENTION

In general, a method of treating a treatment zone in a well is provided. The method includes the step of introducing into the treatment zone: (a) a hydrated sheet silicate mineral; and (b) a chemical activator for expanding the hydrated sheet silicate mineral.

According to an embodiment, a method of treating a treatment zone in a well is provided. The method includes the steps of, in any order: (a) introducing into the treatment zone a first treatment fluid, wherein the first treatment fluid includes: (i) a hydrated sheet silicate mineral; and (ii) water; and (b) introducing into the zone a second treatment fluid including a chemical activator for expanding the hydrated sheet silicate mineral in the treatment zone.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

BRIEF DESCRIPTION OF THE DRAWING

The accompanying drawing is incorporated into the specification to help illustrate examples according to the presently most-preferred embodiment of the invention.

DETAILED DESCRIPTION OF PRESENTLY PREFERRED EMBODIMENTS AND BEST MODE

Definitions and Usages
 Interpretation
 The words or terms used herein have their plain, ordinary meaning in the field of this disclosure, except to the extent explicitly and clearly defined in this disclosure.
 If there is any conflict in the usages of a word or term in this disclosure and one or more patent(s) or other documents that may be incorporated by reference, the definitions that are consistent with this specification should be adopted.
 Patent Terms
 The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps.

When such terms are used, the compositions, apparatuses, and methods that "consist essentially of" or "consist of" the specified components, parts, and steps are specifically included and disclosed.

The indefinite articles "a" or "an" mean one or more than one of the component, part, or step that the article introduces.

Terms such as "first," "second," "third," etc. are assigned arbitrarily and are merely intended to differentiate between two or more fluids, elements, or steps that are otherwise similar or corresponding in nature, structure, function, or action. For example, the words "first" and "second" serve no other purpose and are not part of the name or description of the following name or descriptive terms. The mere use of the term "first" does not require that there be any "second" similar or corresponding component, part, or step. Similarly, the mere use of the word "second" does not require that there by any "first" or "third" similar or corresponding component, part, or step. Further, it is to be understood that the mere use of the term "first" does not require that the element or step be the very first in any sequence, but merely that it is at least one of the elements or steps. Similarly, the mere use of the terms "first" and "second" does not necessarily require any sequence. Accordingly, the mere use of such terms does not exclude intervening elements or steps between the "first" and "second" elements or steps, etc.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

Well Terms

As used herein, introducing "into a well" means introduced at least into and through the wellhead. According to various techniques known in the art, tubulars, equipment, tools, or well fluids can be directed from the wellhead into any desired portion of the wellbore. Additionally, as used herein, "into a treatment zone" means into and through the wellhead and, additionally, through the wellbore and into the treatment zone.

As used herein, the word "treatment" refers to any treatment for changing a condition of a portion of a wellbore or an adjacent subterranean formation; however, the word "treatment" does not necessarily imply any particular treatment purpose. A treatment usually involves introducing a well fluid for the treatment, in which case it may be referred to as a treatment fluid, into a well. As used herein, a "treatment fluid" is a fluid used in a treatment. Unless the context otherwise requires, the word "treatment" in the term "treatment fluid" does not necessarily imply any particular treatment or action by the fluid.

The term "design temperature" refers to an estimate or measurement of the actual temperature at the down hole environment at the time of a well treatment. That is, design temperature takes into account not only the bottom hole static temperature ("BHST"), but also the effect of the temperature of the well fluid on the BHST during treatment. Because treatment fluids may be considerably cooler than BHST, the difference between the two temperatures can be quite large. Ultimately, if left undisturbed, a subterranean formation will return to the BHST.

The near-wellbore region of a zone is usually considered to include the matrix of the rock within a few inches of the borehole. As used herein, the near-wellbore region of a zone is considered to be anywhere within about 12 inches of the wellbore. The far-field region of a zone is usually considered the matrix of the rock that is beyond the near-wellbore region.

Fluid Terms

The physical state or phase of a substance (or mixture of substances) and other physical properties are determined at a temperature of 77° F. (25° C.) and a pressure of 1 atmosphere (Standard Laboratory Conditions) without any applied shear.

As used herein, a fluid is a substance that behaves as a fluid under Standard Laboratory Conditions.

Every fluid inherently has at least a continuous phase. A fluid can have more than one phase. The continuous phase of a well fluid is a liquid under Standard Laboratory Conditions. For example, a well fluid can in the form of be a suspension (solid particles dispersed in a liquid phase), an emulsion (liquid particles dispersed in another liquid phase), or a foam (a gas phase dispersed in liquid phase).

As used herein, a water-based fluid means that water or an aqueous solution is the dominant material, that is, greater than 50% by weight, of the continuous phase of the substance.

In contrast, "oil-based" means that oil is the dominant material by weight of the continuous phase of the substance. In this context, the oil of an oil-based fluid can be any oil. In general, an oil is any substance that is liquid under Standard Laboratory Conditions, is hydrophobic, and soluble in organic solvents. Oils have a high carbon and hydrogen content and are relatively non-polar substances, for example, having a polarity of 3 or less on the Synder polarity index. This general definition includes classes such as petrochemical oils, vegetable oils, and many organic solvents. All oils can be traced back to organic sources.

Permeability

Permeability refers to how easily fluids can flow through a material. For example, if the permeability is high, then fluids will flow more easily and more quickly through the material. If the permeability is low, then fluids will flow less easily and more slowly through the material. As used herein, "high permeability" means the material has a permeability of at least 100 milliDarcy (mD). As used herein, "low permeability" means the material has a permeability of less than 1 mD.

Particle Terms

As used herein, "particulate" or "particulate material" refers to matter in the physical form of distinct particles. A particulate is a grouping of particles based on common characteristics, including chemical composition and particle size range, particle size distribution, or median particle size. As used herein, a particulate is a grouping of particles having similar chemical composition and particle size ranges anywhere in the range of about 1 micrometer (e.g., microscopic clay or silt particles) to about 3 millimeters (e.g., large grains of sand).

A particulate will have a particle size distribution ("PSD"). As used herein, "the size" of a particulate can be determined by methods known to persons skilled in the art.

A particulate can be of solid or liquid particles. As used herein, however, unless the context otherwise requires, particulate refers to a solid particulate. Of course, a solid particulate is a particulate of particles that are in the solid physical state, that is, the constituent atoms, ions, or molecules are sufficiently restricted in their relative movement to result in a fixed shape for each of the particles.

One way to measure the approximate particle size distribution of a solid particulate is with graded screens. A solid particulate material will pass through some specific mesh (that is, have a maximum size; larger pieces will not fit through this mesh) but will be retained by some specific tighter mesh (that is, a minimum size; pieces smaller than this will pass through the mesh). This type of description establishes a range of particle sizes. A "+" before the mesh size indicates the particles are retained by the sieve, while a "−" before the mesh size indicates the particles pass through the sieve. For example, −70/+140 means that 90% or more of the particles will have mesh sizes between the two values.

Particulate materials are sometimes described by a single mesh size, for example, 100 U.S. Standard mesh. If not otherwise stated, a reference to a single particle size means about the mid-point of the industry accepted mesh size range for the particulate.

Particulate smaller than about 400 U.S. Standard Mesh is usually measured or separated according to other methods because small forces such as electrostatic forces can interfere with separating tiny particulate sizes using a wire mesh.

Measurement Terms

Unless otherwise specified or unless the context otherwise clearly requires, any ratio or percentage means by weight.

Unless otherwise specified or unless the context otherwise clearly requires, the phrase "by weight of the water" means the weight of the water of the continuous phase of the fluid without the weight of any viscosity-increasing agent, dissolved salt, suspended particulate, or other materials or additives that may be present in the water.

Any doubt regarding whether units are in U.S. or Imperial units, where there is any difference, U.S. units are intended. For example, "gal/Mgal" means U.S. gallons per thousand U.S. gallons.

The micrometer (μm) may sometimes referred to herein as a micron.

Reducing Permeability of a Zone

The invention uses a natural mineral in particulate form to reduce the permeability of a zone in a well. The mineral is a hydrated sheet silicate mineral ("HSSM").

The methods include the step of placing a hydrated sheet material into a treatment zone of a well. The step of placing can be by pumping a well fluid containing the hydrated sheet silicate mineral into the zone. The natural mineral is expanded in the zone in-situ with chemical activation. The in-situ expansion of the hydrated sheet silicate minerals can block the pore spaces of the subterranean formation, proppant pack, or gravel pack of the treatment zone. The expansion of the mineral can be used to reduce the permeability of the subterranean formation, proppant pack, or gravel pack of the treatment zone.

Introducing the HSSM into a formation and activating it does no damage to the formation, which would otherwise occur with the use of treatments involving polymers.

The particle size of the HSSM can be varied to meet the needs for the particular downhole application in a well. In broadest scope, the particle size can be anywhere in the range of nano-particle size to about 1 cm. Preferably, the particle size is a particulate in the range of about 10 nanometers to about 3 mm. The size of the particulate can be adjusted based on the permeability of the subterranean formation, proppant pack, or gravel pack of a treatment zone. For example, in an embodiment, the particle size for a particular formation would depend on the average grain size of the subterranean formation, proppant pack, or gravel pack. The particle size of the HSSM can be selected using this information.

The invention can provide two important benefits: (1) reducing permeability; and (2) using natural minerals that are friendly to the environment or "green" in nature.

In an embodiment, the zone is a water-producing zone. The method can be used to control water production from the zone, thereby promoting hydrocarbon production. In an embodiment, the methods can be used for reducing or shutting off water production from a zone in a well.

Hydrated Sheet Silicate Mineral ("HSSM")

The silicate minerals make up the largest and most important class of rock-forming minerals, constituting approximately 90 percent of the crust of the Earth. They are classified based on the structure of their silicate group. Silicate minerals all contain silicon and oxygen.

Phyllosilicates or sheet silicates, form parallel sheets of silicate tetrahedra with $Si_2O_5$. Phyllosilicates contain two basic components, which occur in different arrangements. These two basic building blocks are the silica tetrahedron and the aluminum octahedron. The interlayer spaces between these building blocks contain cations or water molecules or both. With increasing interlayer space, comes a greater tendency for shrink or swell behavior.

The term "hydrated sheet silicate mineral" or "HSSM" refers to the phyllosilicate group of silicate minerals which contain superimposed silicate and aluminum layers between which are layers of water molecules. Preferably, the layers of water molecules are at least one water molecule thick. More preferably, the layers of water molecules are less than about 15 water molecules thick.

These minerals include, for example, hydrated laminar magnesium aluminum-silicates, which have a high cation exchange capacity. These materials also include hydrated laminar magnesium-aluminum-iron silicate.

Hydrated sheet silicate minerals are low density, fire-resistant, and odorless.

Hydrated sheet silica minerals expand into accordion-shaped pieces when heated, which expansion is sometimes referred to as being "exfoliated." Without being limited by any theory, it is believed that sufficient heating causes the explosive release of water, which causes the natural mineral crystals expand. The temperature required for heat expansion (without any chemical treatment) is at least 540° C. Such high temperatures are not encountered, however, even in the deepest wells.

The use of expanded HSSM would be an excellent approach for water shut-off, due to its many advantageous properties.

The thermal stability of HSSMs are in the range of about 842-2012° F. (450-1100° C.). Thus, they can be used at all temperature ranges encountered in oil and gas wells, which offers advantages over polymers.

They are insoluble in water.

They are insoluble in hydrochloric acid and heavy brines, which offer advantages over some polymers which are soluble in these liquids.

HSSMs can sustain pressure (up to 2 kilobar or about 29,000 psi) as reported in *American Mineralogist*, Vol. 63, 401-409, 1978).

There is no reported information in literature on interaction of HSSM with hydrocarbon liquids.

They are highly absorbent to $H_2O_2$ solution.

They are also used as a desiccant to remove moisture from air and gases.

They are fire resistant solids with NFPA ratings of Fire 0, Health 1 and reactivity 0.

These characteristics make HSSMs easy to transport and store on field locations without posing safety hazards.

Chemical Activator for Expanding HSSM

A chemical treatment of the hydrated sheet silicate mineral can expand the mineral. Without being limited by any theory, it is believed that the chemical expansion involves the introduction of cations into the interlayer position. For example, it is believed that hydrogen peroxide is catalyzed to decompose by inorganic interlayer cations of the material with the evolution of gaseous oxygen, which helps separate the layers to expand the material. Hence, chemical treatment allows for expansion at lower temperatures than required for expansion by heating alone. For example, a hydrated sheet silicate mineral can be expanded with a chemical activator at 20° C. Of course, the rate of HSSM expansion with a chemical activator is expected to increase with increasing temperature.

According to the invention, the presently most preferred chemical activator for an HSSM is hydrogen peroxide. Without being limited by any theory, it is believed that the decomposition of hydrogen peroxide between the silicate layers is catalyzed by the inorganic interlayer cations and the evolution of oxygen yields separate layers of the mineral. It is believed that a chemical activator is a chemical capable of decomposing in the HSSM under the design temperature for the treatment while generating at least one gas can be useful according to the invention. Preferably, the decomposition should of the chemical activator should not produce any toxic chemicals.

Examples of other chemical activators for exfoliating an HSSM include can be selected from the group consisting of, without limitation: n-butyl ammonium chloride, N-alkyl trimethyl ammonium bromide, N,N'-dialkyl dimethyl ammonium bromide, and α ω-bis(N-alkyl dimethyl ammonium) alkanes.

Such chemical activators are water soluble. Preferably, the chemical activator is introduced into a treatment zone in a water-based well fluid.

An added advantage of expansion of HSSM is the use of $H_2O_2$ as the activator. Currently, in the oil industry, there has been a shift from chloride-based oxidizers to $H_2O_2$.

In chlorine containing bleaches, oxidation often involves addition of chloride atoms (rather than oxygen atoms) to the colored compound. For certain applications, the addition of chloride leads to the formation of hazardous byproducts, such as dioxins (Ref: Bleaching with green oxidation chemistry by Kathryn E. Parent Peroxide oxidation page 1-3). $H_2O_2$ does not contain any chlorine and it differs another advance in "greening" of the process, that is, by completely eliminating the formation of dioxin waste. Hence, the problem of hazardous pollution is prevented at the source.

HSSM in Well Environment

An HSSM is chemically inert except to a few types of chemicals that are chemical activators for it. As it is highly chemically inert, if any other fluid is pumped containing chemicals other than a chemical activator for the HSSM (such as hydrogen peroxide), the HSSM will not react with it. Only a chemical activator for the HSSM will cause it to expand. Thus, the HSSM can be introduced into a well and exposed to well fluids containing other chemicals without expansion until contacted with a chemical activator for the HSSM.

The expansion of an HSSM is irreversible. A fully expanded HSSM is chemically inert in a well environment. It is believed that a fully expanded HSSM is inert even to additional chemical activator. An expanded HSSM can sustain pressure up to 2 kiloBar (about 29000 psi). Thus, an expanded HSSM is highly stable in a well environment.

The expansion property of these hydrated sheet silicate minerals can be utilized for reducing the permeability of a subterranean formation. This can be used, for example, for controlling water production. It is believed that this approach has not previously been used in the oilfield.

Carrier Fluid for Particulate HSSM

It is contemplated that the HSSM will be introduced into a treatment zone of a well as a particulate.

A well fluid can be adapted to be a carrier fluid for particulates.

For example, during drilling, rock cuttings should be carried uphole by the drilling fluid and flowed out of the wellbore. The rock cuttings typically have specific gravity greater than 2, which is much higher than that of many drilling fluids. These high-density cuttings have a tendency to separate from water or oil very rapidly.

Similarly, a proppant used in fracturing or a gravel used in gravel packing may have a much different density than the carrier fluid. For example, sand has a specific gravity of about 2.7, whereas water has a specific gravity of 1.0 at Standard Laboratory conditions of temperature and pressure. A proppant or gravel having a different density than water will tend to separate from water very rapidly.

As many well fluids are water-based, partly for the purpose of helping to suspend particulate of higher density, and for other reasons known in the art, the density of the fluid used in a well can be increased by including highly water-soluble salts in the water, such as potassium chloride. However, increasing the density of a well fluid will rarely be sufficient to match the density of the particulate.

Increasing Viscosity of Fluid for Suspending Particulate

Increasing the viscosity of a well fluid can help prevent a particulate having a different specific gravity than an external phase of the fluid from quickly separating out of the external phase.

A viscosity-increasing agent can be used to increase the ability of a fluid to suspend and carry a particulate material in a well fluid. A viscosity-increasing agent can be used for other purposes, such as matrix diversion or conformance control.

A viscosity-increasing agent is sometimes referred to in the art as a viscosifying agent, viscosifier, thickener, gelling agent, or suspending agent. In general, any of these refers to an agent that includes at least the characteristic of increasing the viscosity of a fluid in which it is dispersed or dissolved. There are several kinds of viscosity-increasing agents and related techniques for increasing the viscosity of a fluid.

Polymers for Increasing Viscosity

Certain kinds of polymers can be used to increase the viscosity of a fluid. In general, the purpose of using a polymer is to increase the ability of the fluid to suspend and carry a particulate material. Polymers for increasing the viscosity of a fluid are preferably soluble in the external phase of a fluid. Polymers for increasing the viscosity of a fluid can be naturally occurring polymers such as polysaccharides, derivatives of naturally occurring polymers, or synthetic polymers.

The viscosity of a fluid at a given concentration of viscosity-increasing agent can be greatly increased by crosslinking the viscosity-increasing agent. A crosslinking agent, sometimes referred to as a crosslinker, can be used for this purpose. A crosslinker interacts with at least two polymer molecules to form a "crosslink" between them.

Viscosifying Surfactants

It should be understood that merely increasing the viscosity of a fluid may only slow the settling or separation of distinct phases and does not necessarily stabilize the suspension of any particles in the fluid.

Certain viscosity-increasing agents can also help suspend a particulate material by increasing the elastic modulus of the fluid. The elastic modulus is the measure of a substance's tendency to be deformed non-permanently when a force is applied to it. The elastic modulus of a fluid, commonly referred to as G', is a mathematical expression and defined as the slope of a stress versus strain curve in the elastic deformation region. G' is expressed in units of pressure, for example, Pa (Pascals) or dynes/cm². As a point of reference, the elastic modulus of water is negligible and considered to be zero.

An example of a viscosity-increasing agent that is also capable of increasing the suspending capacity of a fluid is to use a viscoelastic surfactant. As used herein, the term "viscoelastic surfactant" refers to a surfactant that imparts or is capable of imparting viscoelastic behavior to a fluid due, at least in part, to the association of surfactant molecules to form viscosifying micelles.

Viscoelastic surfactant would be the better option as the viscosity-increasing agent for the carrier fluid, as a polymeric viscosifier may be degraded in the presence of hydrogen peroxide or other chemical activator, especially at design temperatures above room temperature.

Form and Concentration of Viscosity Increasing Agent

The viscosity-increasing agent may be provided in any form that is suitable for the particular treatment fluid or application of the present invention. In certain embodiments, the viscosity-increasing agent may be provided as a liquid, gel, suspension, or solid additive that is admixed or incorporated into a treatment fluid used in conjunction with the present invention.

The viscosity-increasing agent should be present in a treatment fluid in a form and in an amount at least sufficient to impart the desired viscosity to a treatment fluid. For example, in some embodiments, the amount of viscosity-increasing agent used in the treatment fluids suitable for use in the present invention may vary from about 0.25 pounds per 1,000 gallons of treatment fluid ("lbs/Mgal") to about 200 lbs/Mgal. In other embodiments, the amount of viscosity-increasing agent included in the treatment fluids suitable for use in the present invention may vary from about 10 lbs/Mgal to about 80 lbs/Mgal. In another embodiment, about 20 pounds to about 70 pounds (lbs) of water-soluble polymer per 1,000 gallons (Mgal) of water (equivalent to about 2.4 g/L to about 8.4 g/L).

Breaker for Viscosity of Fluid

After a treatment fluid is placed where desired in the well and for the desired time, the fluid usually must be removed from the wellbore or the formation. For example, in the case of hydraulic fracturing, the fluid should be removed leaving the proppant in the fracture and without damaging the conductivity of the proppant bed. To accomplish this removal, the viscosity of the treatment fluid must be reduced to a very low viscosity, preferably near the viscosity of water, for optimal removal from the propped fracture. Similarly, when a viscosified fluid is used for gravel packing, the viscosified fluid must be removed from the gravel pack.

Reducing the viscosity of a viscosified fluid is referred to as "breaking" the fluid. Chemicals used to reduce the viscosity of fracturing fluids are called breakers. Other types of viscosified well fluids also need to be broken for removal from the wellbore or subterranean formation.

No particular mechanism is necessarily implied by the term. For example, a breaker can reduce the molecular weight of a water-soluble polymer by cutting the long polymer chain. As the length of the polymer chain is cut, the viscosity of the fluid is reduced. For instance, reducing the guar polymer molecular weight to shorter chains having a molecular weight of about 10,000 converts the fluid to near water-thin viscosity. This process can occur independently of any cros slinking bonds existing between polymer chains.

Breakers must be selected to meet the needs of each situation. First, it is important to understand the general performance criteria of breakers. In reducing the viscosity of the treatment fluid to a near water-thin state, the breaker must maintain a critical balance. Premature reduction of viscosity during the pumping of a treatment fluid can jeopardize the treatment. Inadequate reduction of fluid viscosity after pumping can also reduce production if the required conductivity is not obtained.

In fracturing, for example, the ideal viscosity versus time profile would be if a fluid maintained 100% viscosity until the fracture closed on proppant and then immediately broke to a thin fluid. Some breaking inherently occurs during the 0.5 to 4 hours required to pump most treatments. One guideline for selecting an acceptable breaker design is that at least 50% of the fluid viscosity should be maintained at the end of the pumping time. This guideline may be adjusted according to job time, desired fracture length, and required fluid viscosity at the design temperature of the treatment.

Chemical breakers used to reduce viscosity of a fluid viscosified with a viscosifying polymer used in fracturing or other subterranean applications are generally grouped into three classes: oxidizers, enzymes, and acids. The breakers operate by cleaving the backbone of polymer either by hydrolysis of acetyl group, cleavage of glycosidic bonds, oxidative/reductive cleavage, free radical breakage or combination of these processes. A breaker should be selected based on its performance in the temperature, pH, time, and desired viscosity profile for each specific treatment.

A breaker may be included in a treatment fluid in a form and concentration at selected to achieve the desired viscosity reduction at a desired time.

In certain embodiments according to the invention, the chemical activator for the HSSM can also function as a breaker. For example, hydrogen peroxide may be used as a breaker for certain viscosity-increasing agents.

Well Fluid Additives

A well fluid according to the invention can contain additives that are commonly used in oil field applications, as known to those skilled in the art. For example, these include, but are not necessarily limited to, brines, inorganic water-soluble salts, salt substitutes (such as trimethyl ammonium chloride), pH control additives, surfactants, breakers, breaker aids, oxygen scavengers, alcohols, scale inhibitors, corrosion inhibitors, hydrate inhibitors, fluid-loss control additives, oxidizers, chelating agents, water control agents (such as relative permeability modifiers), consolidating agents, proppant flowback control agents, conductivity enhancing agents, clay stabilizers, sulfide scavengers, fibers, bactericides, and combinations thereof.

The use of any well fluid additive with the invention should be compatible with the use of the HSSM in the method.

Method Steps

In general, a method of treating a treatment zone in a well is provided. The method includes the step of introducing into the treatment zone: (a) a hydrated sheet silicate mineral; and (b) a chemical activator for expanding the hydrated sheet silicate mineral. The HSSM and the chemical activator can be introduced into the treatment zone according to any convenient techniques for introducing particulates and chemicals that are known in the field.

According to an embodiment, a method of treating a treatment zone in a well is provided, where the method includes the steps of, in any order: (a) introducing into the treatment zone a first treatment fluid, wherein the first treatment fluid includes: (i) a hydrated sheet silicate mineral; and (ii) water; and (b) introducing into the zone a second treatment fluid including a chemical activator for expanding the hydrated sheet silicate mineral in the treatment zone.

According to some embodiments of the invention, the HSSM can be combined with a carrier fluid to form a carrier solution before being placed in a well bore. The carrier fluid is preferably aqueous. The carrier fluid can be any suitable fluid that is pumpable for moving the HSSM to a desired treatment zone in a well.

The particle size distribution of the HSSM is selected as described above. The HSSM is incorporated in an effective concentration and amount to effectively reduce the permeability of at least a portion of a treatment zone upon being placed into the subterranean formation and then chemically expanded. The effective concentration and amount may vary depending on factors such as the type of the carrier fluid, the nature of the portion of the treatment zone for which the permeability is to be reduced, and the like that will be appreciated by those of skill in the field. In an embodiment, the treatment zone includes a portion of a subterranean formation having permeability greater than 0.1 milliDarcy. The concentration of HSSM that can be combined with the carrier fluid depends on a number of factors, including the type and suspending capacity of the carrier fluid.

The method preferably includes, after introducing both the HSSM and the chemical activator, flowing back from the treatment zone.

Forming a Well Fluid

A well fluid can be prepared at the job site, prepared at a plant or facility prior to use, or certain components of the well fluid can be pre-mixed prior to use and then transported to the job site. Certain components of the well fluid may be provided as a "dry mix" to be combined with fluid or other components prior to or during introducing the well fluid into the well.

In certain embodiments, the preparation of a well fluid of the present invention can be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

Introducing Into Well or Treatment Zone

Often the step of delivering a well fluid into a well is within a relatively short period after forming the well fluid, e.g., less within 30 minutes to one hour. More preferably, the step of delivering the well fluid is immediately after the step of forming the well fluid, which is "on the fly."

It should be understood that the step of delivering a well fluid into a well can advantageously include the use of one or more fluid pumps.

Shutting In the Treatment Zone

Preferably, after introducing the HSSM and the chemical activator into the treatment zone, the method includes the step of shutting in the treatment zone. The step of shutting in is preferably for a sufficient time at the design temperature for fully expanding the HSSM in situ.

Flow Back Conditions

In an embodiment, the step of flowing back is within 48 hours of introducing the HSSM and the chemical activator into the treatment. In another embodiment, the step of flowing back is within 24 hours. Preferably, the step of flowing back is within 4 hours of the step or steps of introducing.

After Well Treatment, Producing Hydrocarbon from Subterranean Formation

Preferably, after any well treatment according to the invention, a step of producing hydrocarbon from the subterranean formation is the desirable objective.

HSSM Applications in a Well

The invention can be used in producing wells or injection wells.

In an embodiment, the zone is a water-producing zone of a producing well. The method can be used to control water production from the zone, thereby promoting hydrocarbon production. In an embodiment, the methods can be used for reducing or shutting off water production from a zone in a well.

The amount of oil production may be monitored to determine if more HSSM should be added to the zone to block additional permeable areas and thus improve production. If needed, additional HSSM can be introduced into the treatment zone. This procedure may be repeated until the amount of HSSM is sufficient to achieve the desired amount of production.

In an embodiment, the HSSM is introduced into one or more injection wells after termination of the production stage of the primary well. Secondary and/or tertiary flooding operations may also be performed by displacing one or more injectants into an injection well and through the reservoir to drive additional oil from the reservoir to the production wells. The presence of the fluid of the invention in the permeable zones serves to substantially block or seal the flow pathways of the injectants through the permeable zones. Preferably, the HSSM is introduced and expanded prior to the displacing injectants. Advantageously, displacing injectants do not prematurely pass through the permeable zones to the production wells before having been introduced through areas of the reservoir-containing oil.

When used in injection applications, the injectant can be any suitable fluid for causing movement of oil in the flow direction of the fluids as they pass from an injection well through a reservoir containing the oil to a production well. Examples of suitable injectants include fresh water, brine, and gases such as carbon dioxide. Preferably, an aqueous solution serves as both the carrier fluid and an injectant. The HSSM may be introduced to an injectant stream as it is being pumped into an injection well such that the injectant stream also acts as the carrier fluid for the swelling agent.

EXAMPLES

To facilitate a better understanding of the present invention, the following examples of certain aspects of some embodiments are given. In no way should the following examples be read to limit, or define, the entire scope of the invention.

HSSM Samples

Some hydrated sheet silicate minerals are sensitive to water but not brine and may swell in the presence of water. Hence, these minerals can be tested in the presence of brine so as to study the effect of only the activator on the HSSM. An HSSM that is not sensitive to water can be tested in water itself to study the effect of the activator on the HSSM.

Accordingly, two different HSSM were tested for use according to the invention.

The "HSSM-1" is a sample of vermiculite, which has a chemical composition of $(MgFe,Al)_3(Al,Si)_4O_{10}(OH)_2 \cdot 4H_2O$. The HSSM-1 is not sensitive to water.

The "HSSM-2" is a sample of montmorillonite, which has a chemical composition of $(Na, Ca)_{0.33}(Al,Mg)_2Si_4O_{10}(OH)_2 \cdot nH_2O$. HSSM-2 may be sensitive to water, so it can be tested in brine to determine the effect of the activator alone on this type of HSSM.

Static Tests

Expansion can be achieved by application of high heat (i.e., greater than 540° C.) or treatment with a suitable chemical activator. A few experiments were conducted in the lab to observe the effect of activator chemicals and temperatures that may be encountered in a well environment on HSSM-1.

A first static test on HSSM-1 was conducted as follows. A solid sample HSSM-1 was measured as having an initial height of 2.8 mm. This sample was soaked in 30% $H_2O_2$ at 39.2° F. for 48 hours. The sample, which had increased in height dramatically, was then heated at 212° F. for 1 hour. The final size of the sample 54 mm in height. The increase in height was 51.2 mm or 1828%. Expansion at this low temperature for long durations may not be practical for oil field applications. Hence, the next tests were carried out by varying the temperature, soaking time, and $H_2O_2$ concentration.

In a second static test, a sample of HSSM-1 was soaked in 30% $H_2O_2$ at 77° F. for 24 hours. A similar amount of material expansion was observed as under the conditions of the first static test. This shows that lower soaking time and at a temperature higher than 39° F. can also lead to expansion.

In a third static test, a sample of HSSM-1 was soaked in 15% $H_2O_2$ at 161.6° F. for only 4 hours. A similar amount of expansion was observed as under the conditions of the first static.

The above tests confirmed that HSSM-1 can be exfoliated under a variety of conditions and, hence, this treatment can be customized depending on formation characteristics and job requirements.

Water Shut-off Tests with Hydrated Sheet Silicate Minerals

Two hydrated sheet silicate minerals were selected for water shut-off testing. These are referred to as "HSSM-1" and "HSSM-2".

Figure 1:
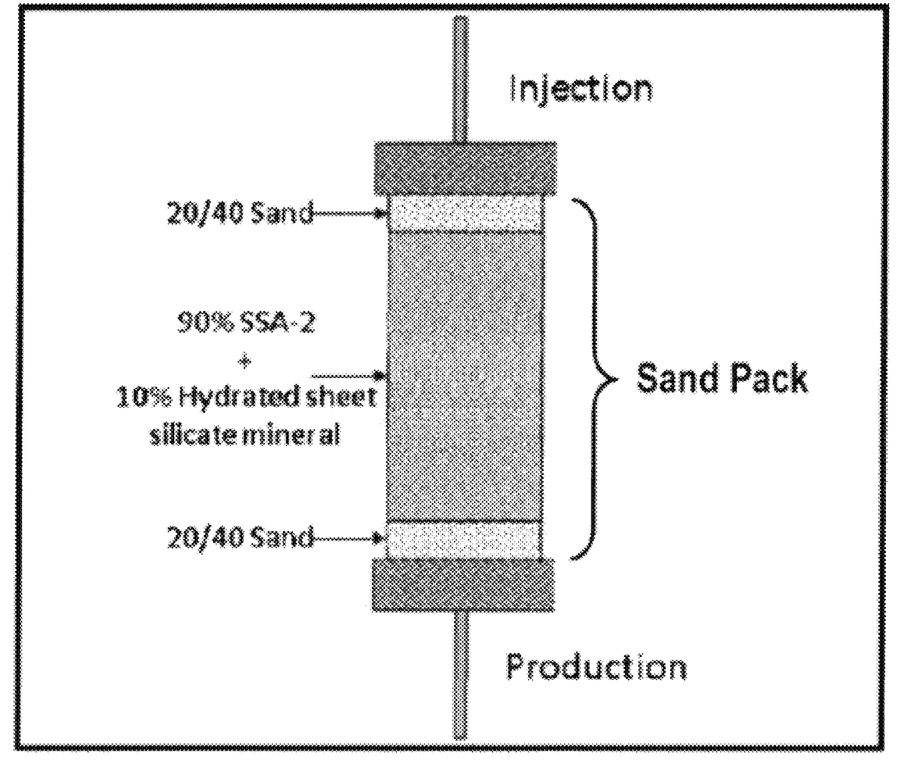
FIG. 1 is an illustration of a permeability test cell for testing the reduction in permeability of a sand pack that can be achieved by the expansion of a hydrated sheet silicate in the sand pack.

A sand pack test cell was prepared as illustrated in FIG. 1. A sand pack consisting essentially of 90% SSA-2™ silica sand and 10% of a hydrated sheet silicate mineral ("HSSM") was prepared.

The silica sand was 100 mesh (about 149 microns).

The HSSM-1 was crushed and passed through a 100 mesh sieve to have an average particle size in the range of about 80 to 120 microns. The HSSM-2 had an average particle size in the range of about 74 microns.

Tests were run at two different temperatures with varying concentrations of $H_2O_2$ as well as different shut-in times. The total amount of the hydrogen peroxide solution used was a stated multiple of the pore volume.

Pore volume is the volume of void space within the rock that can contain fluids. Porosity can be loosely characterized by the interstices of the rock. The porosity is that fraction of total rock volume which can be filled with water, gas, or oil. Thus, two components of a porous rock system can be expressed as the grain volume (the volume occupied by grains) and the pore volume (that is the volume occupied by pore spaces).

The water shut-off tests were carried out as per the steps follows: (1) Recorded initial permeability of the sand pack to water in the production direction; (2) Injected an $H_2O_2$ solution into the pack while monitoring the differential pressure; (3) Shut in the test for the specified time; and (4) Recorded regained permeability to water in the production direction to determine the water shutoff percentage.

A summary of the results is given in the Table 1.

TABLE 1

| | Water Shut-off Results | | |
|---|---|---|---|
| | Test No. 1 | Test No. 2 | Test No. 3 |
| HSSM Type | HSSM-1 | HSSM-1 | HSSM-2 |
| Temperature | 77° F. | 161.6° F. | 161.6° F. |
| $H_2O_2$ Concentration in Water | 30% | 15% | 15% |
| Pore Volume | 3 | 10 | 1.8 |
| Shut-in Time | 16 hours | 1 hour | 1 hour |
| Initial Permeability to Water | 268 mD | 47 mD | 990 mD |
| Final Permeability to Water | 52 mD | 14 mD | 7.6 mD |
| Water Shut-Off | 81% | 70% | 99% |

The above results demonstrate that concentration and pore volumes of $H_2O_2$, shut-in time and temperature can be varied to customize the water shut-off treatment depending on the formation characteristics as well as job requirements.

No Effect of Hydrocarbons on HSSM

In addition, it was confirmed in static testing that a hydrocarbon (such as diesel) had no effect on the HSSM-1 or HSSM-2, either before or after expansion. Thus, it is believed that HSSMs are inert to hydrocarbons.

Conclusion

The above invention describes a natural mineral introduced into a treatment zone of a well. In these kinds of treatments, there is no damage to the formation, which would otherwise occur with other synthetic treatments involving polymers. Hence, the novelty of this invention is also the environment friendly or green nature of the components of this approach.

Among other things, the method provides for controlling produced water. Expanded HSSM will selectively block or impede water flow in those zones of the formation through which water predominantly flows, leaving the hydrocarbon producing zones substantially unchanged.

Therefore, the present invention is well adapted to attain the ends and advantages mentioned as well as those that are inherent therein.

The particular embodiments disclosed above are illustrative only, as the present invention may be modified and practiced in different but equivalent manners apparent to those skilled in the art having the benefit of the teachings herein. It is, therefore, evident that the particular illustrative embodiments disclosed above may be altered or modified and all such variations are considered within the scope and spirit of the present invention.

The various elements or steps according to the disclosed elements or steps can be combined advantageously or practiced together in various combinations or sub-combinations of elements or sequences of steps to increase the efficiency and benefits that can be obtained from the invention.

The invention illustratively disclosed herein suitably may be practiced in the absence of any element or step that is not specifically disclosed or claimed.

Furthermore, no limitations are intended to the details of composition or steps, other than as described in the claims.

What is claimed is:

1. A method of treating a treatment zone in a well, the method comprising the step of introducing into the treatment zone: (a) a hydrated sheet silicate mineral; and (b) a chemical activator for expanding the hydrated sheet silicate mineral, the chemical activator being capable of decomposing in the hydrated sheet silicate mineral under a design temperature for the treatment while generating at least one gas.

2. The method according to claim 1, wherein the hydrated sheet silicate mineral is a hydrated laminar magnesium-aluminum silicate.

3. The method according to claim 1, wherein the hydrated sheet silicate mineral is a hydrated laminar magnesium-aluminum-iron silicate.

4. The method according to claim 1, wherein the hydrated sheet silicate mineral is vermiculite.

5. The method according to claim 1, wherein the hydrated sheet silicate mineral is montmorillonite.

6. The method according to claim 1, wherein the hydrated sheet silicate mineral is in particulate form.

7. The method according to claim 6, wherein the particulate of the hydrated sheet silicate mineral has an average particle size in the range of 10 nanometers to 3 mm.

8. The method according to claim 1, wherein the chemical activator is hydrogen peroxide.

9. The method according to claim 1, wherein the step of introducing comprises: introducing the hydrated sheet silicate mineral and the chemical activator in a water-based treatment fluid.

10. The method according to claim 1, wherein the treatment zone includes a portion of a subterranean formation having permeability greater than 0.1 milliDarcy.

11. The method according to claim 1, wherein the treatment zone includes a proppant pack or gravel pack.

12. The method according to claim 1, further comprising, after the step of introducing, the step of shutting in the treatment zone for at least one hour.

13. The method according to claim 1, further comprising the step of flowing back from the treatment zone after the step of introducing.

14. A method of treating a treatment zone in a well, the method comprising the step of introducing into the treatment zone: (a) a hydrated sheet silicate mineral; and (b) a chemical activator for expanding the hydrated sheet silicate mineral, wherein the hydrated sheet silicate mineral has layers of water molecules that are less than about 15 water molecules thick.

15. A method of treating a treatment zone in a well, the method comprising the step of introducing into the treatment zone: (a) a hydrated sheet silicate mineral; and (b) a chemical activator for expanding the hydrated sheet silicate mineral, wherein the chemical activator is selected from the group consisting of: n-butyl ammonium chloride, N-alkyl trimethyl ammonium bromide, N, N'-dialkyl dimethyl ammonium bromide, and α ω-bis (N-alkyl dimethyl ammonium) alkanes.

16. The method according to claim 15, wherein the chemical activator is selected from the group consisting of: n-butyl ammonium chloride, N-alkyl trimethyl ammonium bromide, and N, N'-dialkyl dimethyl ammonium bromide.

17. A method of treating a treatment zone in a well, the method comprising the step of introducing into the treatment zone: (a) a hydrated sheet silicate mineral; and (b) a chemical activator for expanding the hydrated sheet silicate mineral, wherein the step of introducing comprises: introducing the hydrated sheet silicate mineral and the chemical activator in a water-based treatment fluid and wherein the water-based treatment fluid comprises a viscosity-increasing agent.

18. The method according to claim 17, wherein the viscosity-increasing agent is a viscoelastic surfactant.

19. The method according to claim 17, wherein the water-based treatment fluid comprises a breaker.

20. The method according to claim 17, wherein the water-based treatment fluid comprises a proppant or gravel.

21. A method of treating a treatment zone in a well, the method comprising the steps of, in any order:
(a) introducing into the treatment zone a first treatment fluid, wherein the first treatment fluid comprises:
(i) a hydrated sheet silicate mineral; and
(ii) water; and
(b) introducing into the zone a second treatment fluid comprising a chemical activator for expanding the hydrated sheet silicate mineral in the treatment zone, the chemical activator being capable of decomposing in the hydrated sheet silicate mineral under a design temperature for the treatment while generating at least one gas.

22. The method according to claim 21, wherein the chemical activator is hydrogen peroxide.

* * * * *